United States Patent
Vaslin et al.

(10) Patent No.: US 6,417,640 B1
(45) Date of Patent: Jul. 9, 2002

(54) DISPLACEMENT SENSORS FOR SERVO-CONTROL ACTUATORS

(75) Inventors: Jean-Philippe Vaslin, Le Chesnay; Alain Roy, Ecouen, both of (FR)

(73) Assignee: Lucas Aerospace FCS (FR)

( * ) Notice: Subject to any disclaimer, the term of this patent is extended or adjusted under 35 U.S.C. 154(b) by 0 days.

(21) Appl. No.: 09/616,394

(22) Filed: Jul. 14, 2000

(30) Foreign Application Priority Data

Jul. 16, 1999 (FR) ............................................. 99 09241

(51) Int. Cl.$^7$ ............................................. G05B 11/01
(52) U.S. Cl. ........................ 318/560; 318/561; 318/570; 318/571; 318/573; 91/363 A; 91/375 R; 91/383; 91/387; 51/34 C; 51/165.87; 416/37; 416/61; 416/147; 60/406
(58) Field of Search ................................. 318/560, 561, 318/570, 571, 573; 91/375 R, 383, 363 A, 387; 73/862.64, 862, 57, 168, 862.32; 51/34 C, 165.87; 251/138; 416/37, 61, 147; 60/406

(56) References Cited

U.S. PATENT DOCUMENTS

| 3,863,546 | A | * | 2/1975 | Saida et al. |
| 4,422,341 | A | * | 12/1983 | Santo et al. |
| 4,528,776 | A | * | 7/1985 | Estabrook |
| 4,530,487 | A | * | 7/1985 | Tew et al. |
| 4,660,416 | A | * | 4/1987 | Charbonneau et al. |
| 5,058,468 | A | * | 10/1991 | Lessway |
| 5,186,608 | A | * | 2/1993 | Bagge |
| 5,263,556 | A | | 11/1993 | Frania |
| 5,740,782 | A | | 4/1998 | Lowi, Jr. |
| 5,899,064 | A | * | 5/1999 | Cheung |

FOREIGN PATENT DOCUMENTS

DE 40 17 715 12/1991

* cited by examiner

*Primary Examiner*—Robert E. Nappi
*Assistant Examiner*—Tyrone Smith
(74) *Attorney, Agent, or Firm*—Blakely Sokoloff Taylor & Zafman

(57) ABSTRACT

A structure comprising firstly a differential sensor of linear displacement comprising a body and a core slidably mounted relative to said body, and secondly a rod of a servo-control actuator in which the core is mounted, said rod terminating in an endpiece which has a bore in which the core is received close to its end, said bore and the core having complementary threads which co-operate to hold said core relative to said bore, and means enabling the engagement of the core in said bore to be adjusted, wherein said means comprise an adjustment screw extending through the actuator rod and whose thread co-operates with complementary means carried by the core so that turning movement applied to the adjustment screw by an operator gives rise to axial displacement of the core in the bore of the endpiece.

7 Claims, 3 Drawing Sheets

DISPLACEMENT SENSORS FOR SERVO-CONTROL ACTUATORS

The present invention relates to displacement sensors for servo-control actuators.

BACKGROUND OF THE INVENTION

Linear variable differential transducers (LVDTs) are conventionally used as sensors for servo-control actuators, and in particular in the aviation field for flight control actuators.

As shown in FIG. 1, such a displacement sensor usually comprises a sensor body 1 which is fixed on one end of the cylinder 2 of the actuator and which extends lengthwise relative to said actuator.

One or more coils are placed in conventional manner inside the body 1.

A core-forming plunger 4 is slidably mounted in the body 1 and extends in the rod 3 of the actuator beyond said body 1, being fixed on an endpiece 5 that terminates said rod 3. This endpiece is generally constituted by a connection piece having the hinge of the actuator mounted thereon.

It is necessary for such a displacement sensor to be capable of being adjusted, particularly when the actuator is being installed, e.g. on an aircraft, or else during operation of the actuator, in order to take account of any drift in the actuator or the sensor.

For this purpose, structures are already known in which the core 4 of the sensor is fixed on the endpiece 5 which terminates the rod 3 of the actuator by cooperation between an outside thread on the core 4 and an inside thread of the endpiece 5.

Adjustment means enable the core 4 to be rotated so as to adjust the depth with which it is engaged in the endpiece 5.

In known structures, the adjustment means are constituted by a knurled knob which meshes with the thread of the core 4.

For this purpose, a recess is provided in the connection piece at the endpiece 5, which recess passes through the thickness of the connection piece and receives the knob.

Such a structure presents several drawbacks.

In particular, it makes it necessary to provide a recess for receiving the knob in a portion of the connection piece of the hinged link which terminates the endpiece, i.e. in a part which is subject to high levels of stress.

This weakens the connection piece of the hinge, thereby making it necessary to increase the size of the connection piece.

Furthermore, the above-mentioned known structures do not enable very great accuracy to be obtained when adjusting the sensor.

OBJECTS AND SUMMARY OF THE INVENTION

Objects of the invention are to mitigate those drawbacks.

The invention proposes a structure comprising firstly a differential sensor of linear displacement comprising a body and a core slidably mounted relative to said body, and secondly a rod of a servo-control actuator in which the core is mounted, said rod terminating in an endpiece which has a bore in which the core is received close to its end, said bore and the core having complementary threads which co-operate to hold said core relative to said bore, and means enabling the engagement of the core in said bore to be adjusted, wherein said means comprise an adjustment screw extending through the actuator rod and whose thread co-operates with complementary means carried by the core so that turning movement applied to the adjustment screw by an operator gives rise to axial displacement of the core in the bore of the endpiece.

The invention is advantageously associated with the various following characteristics taken singly or in any feasible combination:

the said adjustment screw extends through the actuator rod perpendicularly to the plane of a connection piece of a hinge which terminates the endpiece of the actuator rod;

the complementary means with which the thread of the adjustment screw co-operates is constituted by fluting extending a portion of the core;

the structure includes a locking screw which extends parallel to the adjustment screw and which presents a projection in the vicinity of its head, the projection extending perpendicularly to said adjustment screw and being designed to engage in a slot in the head of said adjustment screw to lock said screw in a given position;

the adjustment screw has a single diametral slot or it has a cross-shaped slot; and the core has a guiding bearing surface between its fluted portion and a threaded portion whose thread cooperates with the thread of the bore of the endpiece.

The invention also proposes a servo-control actuator and in particular an aircraft flight control actuator, the actuator including a structure of the above-specified type.

BRIEF DESCRIPTION OF THE DRAWINGS

Other characteristics and advantages of the invention will appear further on reading the following description. The description is purely illustrative and non-limiting. It should be read with reference to the accompanying drawings, in which.

MORE DETAILED DESCRIPTION

Figure 1:
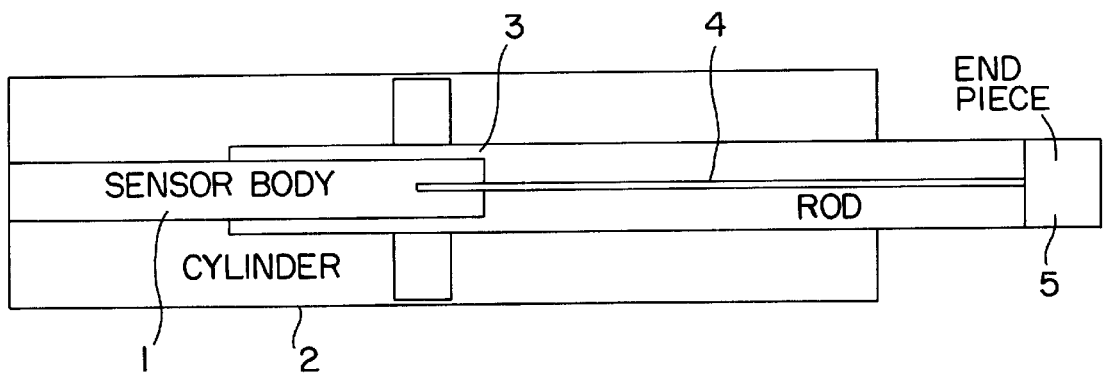
FIG. 1, described above, is a diagrammatic section view of an actuator including a differential sensor of linear displacement.
Figure 2:
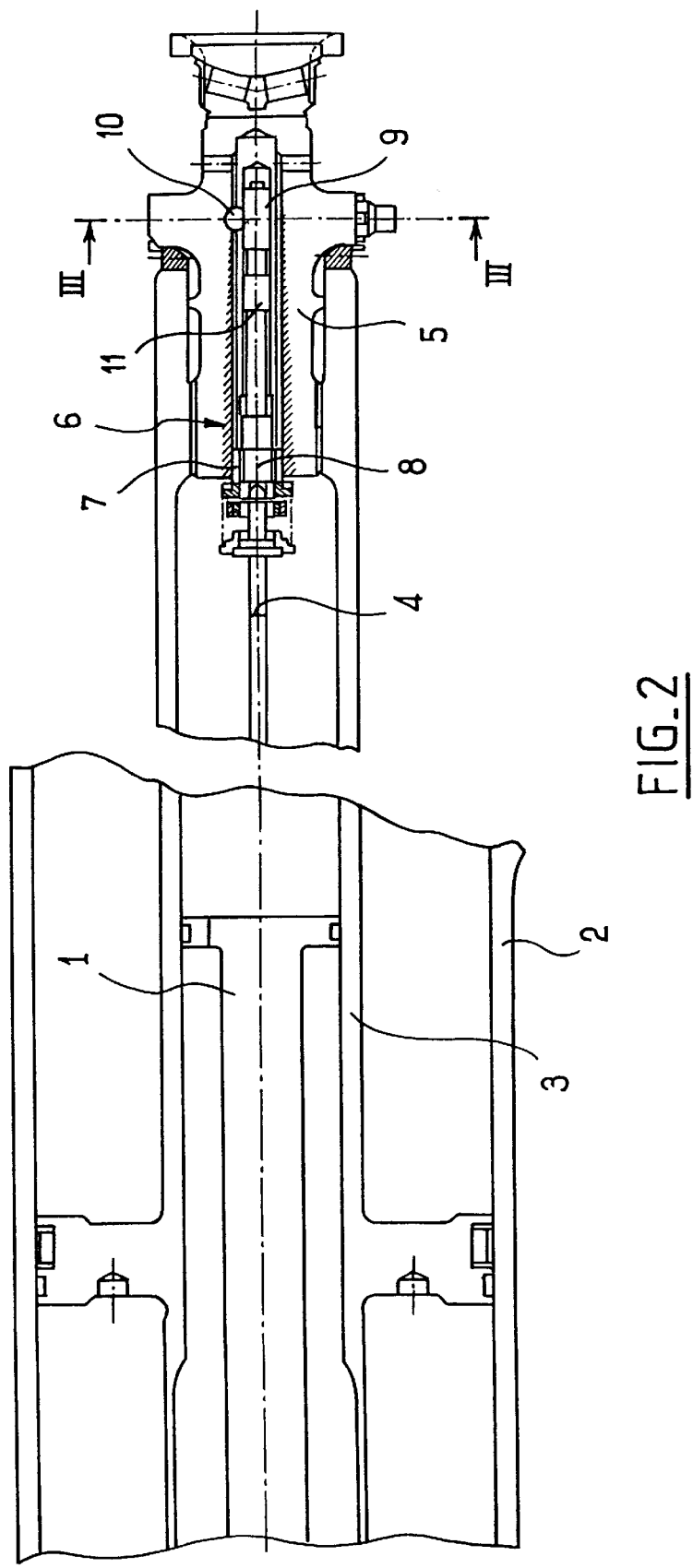
FIG. 2 is a fragmentary section view of an actuator including a structure constituting a possible embodiment of the invention.
Figure 3:
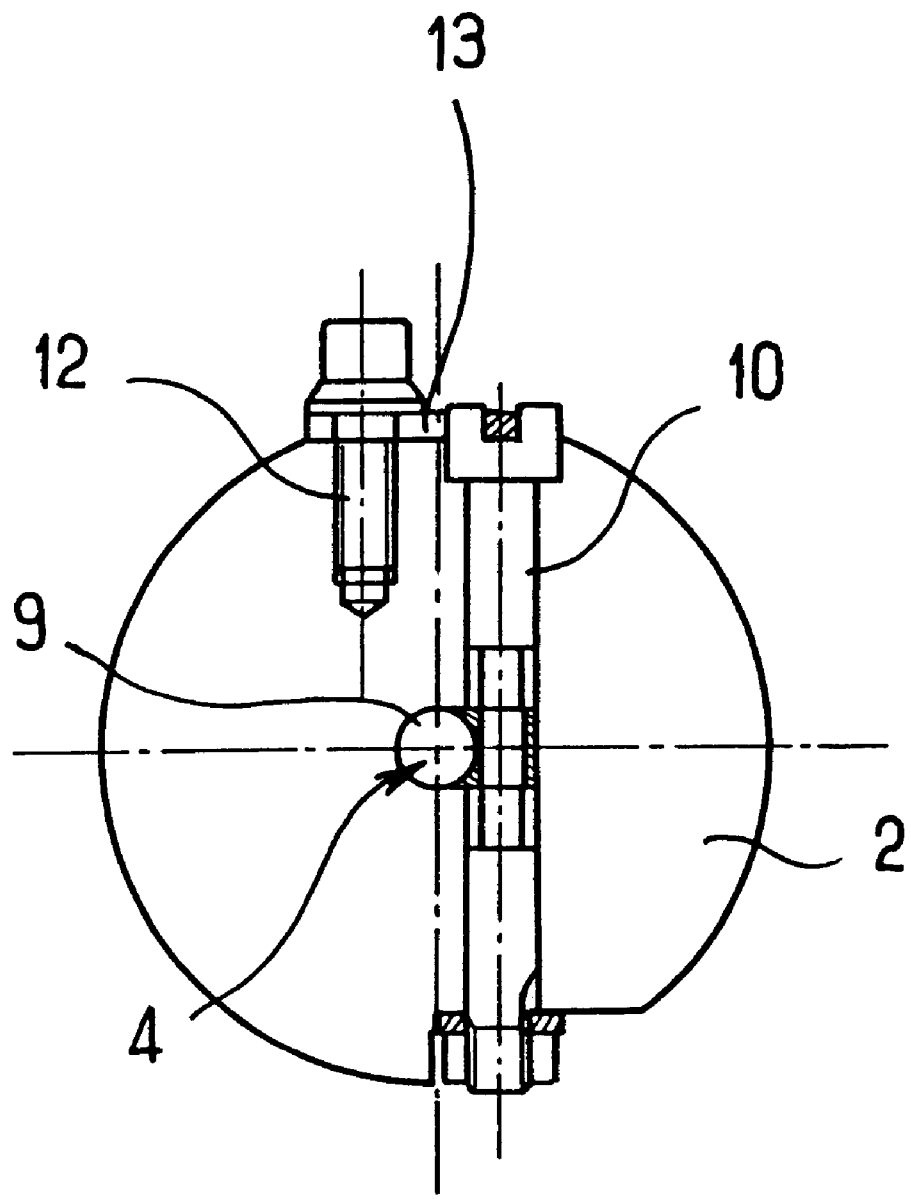
FIG. 3 is a section view on line III—III of FIG. 2.

Those elements shown in FIG. 1 which are also to be found in FIGS. 2 and 3 are given the same reference numerals.

In particular, FIG. 2 shows:

the body 1 of an LVDT displacement sensor;

the core 4 thereof;

the cylinder 2 and the rod 3 of the actuator in which the sensor is mounted; and the endpiece 5 terminating the rod 3.

The inside of the endpiece 5 has a bore 6 of generally cylindrical shape in which the end of the core 4 is received.

At its end closer to the body 1, the bore 6 has a portion 7 which is threaded and whose thread meshes with a complementary thread on the core 4.

The portion of the core 4 on which said complementary thread is provided is referenced 8 in FIG. 2.

Between its end and said portion 8, the core 4 also has a portion 9 which is fluted.

The fluting meshes with the thread of an adjustment screw 10.

The adjustment screw 10 is received in a housing which passes through the rod 3 tangentially to the core 4 and perpendicularly to the plane of the connection piece hinge which terminates the endpiece 5.

It will be observed in FIG. 2 that this adjustment screw 10 is shown lying behind the section plane, whereas in fact it lies in front of it, see FIG. 3.

To adjust the displacement sensor, an operator turns the adjustment screw 10. Rotation of the adjustment screw 10 rotates the core 4 inside the bore 6 by the thread of said screw meshing with the fluting on the portion 9.

Because the thread of the portion 7 of the bore 6 meshes with the thread of the portion 8 of the core 4, the core 4 is also caused to move axially along its own axis while rotating.

Between the threaded and fluted portions 8 and 9, the core 4 also has a cylindrical bearing surface 11 whose function is to guide the core 4 as it moves in the drainage bore.

It will be observed that the above-described structure makes it possible, for given mechanical strength, to provide a connection piece for the endpiece 5 that is much smaller than is possible with known prior art structures.

In addition, because the adjustment screw 10 extends perpendicularly to the plane of the connection piece which terminates the endpiece 5 and not parallel to said plane, the presence of this adjustment screw does not weaken the connection between the rod and the hinge mounted on said connection piece.

Furthermore, as shown in FIG. 3, a locking screw 12 is provided beside the adjustment screw 10 and penetrates into the rod 3 parallel to the adjustment screw 10, but is shorter than said screw 10.

This locking screw 12 has a projection 13 extending perpendicularly to said screw in the vicinity of its head and designed to engage in a slot in the head of the adjustment screw 10 so as to lock said screw 10 in a given position.

When the head of the adjustment screw 10 has only one diametral slot, then the adjustment it can be used to make is precise to within a half a turn of the screw 10.

When the adjustment screw 10 has a cross-shaped slot, then the adjustment it can be used to perform has precision that corresponds to one-fourth of a turn of the adjustment screw 10.

This makes it possible to achieve adjustment that is particularly accurate.

What is claimed is:

1. A servo-control actuator of the type comprising a cylinder and an actuator rod mounted in said cylinder, said servo-control actuator also comprising a differential sensor of linear displacement, said sensor comprising a body and a core slidably mounted relative to said body, said core being mounted in the actuator rod, said rod terminating in an endpiece which has a bore in which the core is received close to its end, said bore and the core having complementary threads which cooperate to hold said core relative to said bore, wherein said bore comprise an adjustment screw extending across the actuator rod, tangentially to the core, and whose thread co-operates with complementary means carried by the core so that turning movement applied to the adjustment screw by an operator gives rise to axial displacement of the core in the bore of the endpiece.

2. A structure according to claim 1, wherein said adjustment screw extends through the actuator rod perpendicularly to the plane of a connection piece of a hinge which terminates the endpiece of the actuator rod.

3. A structure according to claim 1, wherein the complementary means with which the thread of the adjustment screw co-operates is constituted by fluting extending a portion of the core.

4. A structure according to claim 1, including a locking screw which extends parallel to the adjustment screw and which presents a projection in the vicinity of its head, the projection extending perpendicularly to said adjustment screw and being designed to engage in a slot in the head of said adjustment screw to lock said screw in a given position.

5. A structure according to claim 4, wherein the adjustment screw has a single diametral slot.

6. A structure according to claim 4, wherein the adjustment screw has a cross-shaped slot.

7. An aircraft servo-control actuator of the type comprising a cylinder and an actuator rod mounted in said cylinder, said servo-control actuator also comprising a differential sensor of linear displacement, said sensor comprising a body and a core slidably mounted relative to said body, said core being mounted in the actuator rod, said rod terminating in an endpiece which as a bore in which the core is received closed to its end, said bore and the core having complementary threads which cooperate to hold said core relative to said bore, wherein said bore comprises an adjustment screw extending across the actuator rod, tangentially to the core, and whose thread co-operates with complementary means carried by the core so that turning movement applied to the adjustment screw by an operator gives rise to axial displacement of the core in the bore of the endpiece.

* * * * *

UNITED STATES PATENT AND TRADEMARK OFFICE
CERTIFICATE OF CORRECTION

PATENT NO. : 6,417,640 B1
DATED : July 9, 2002
INVENTOR(S) : Vaslin et al.

It is certified that error appears in the above-identified patent and that said Letters Patent is hereby corrected as shown below:

Title page,
Item [56], References Cited, U.S. PATENT DOCUMENTS, please delete "Santo et al." and insert -- Espiritu Santo et al. --.
Item [73], Assignee, please delete "Lucas Aerospace FCS (FR)" and insert -- TRW Systemes Aeronautiques Civils (FR) --.

Signed and Sealed this

Fifteenth Day of November, 2005

JON W. DUDAS
*Director of the United States Patent and Trademark Office*